United States Patent
Cowling et al.

(10) Patent No.: US 9,405,643 B2
(45) Date of Patent: Aug. 2, 2016

(54) MULTI-LEVEL LOOKUP ARCHITECTURE TO FACILITATE FAILURE RECOVERY

(71) Applicant: Dropbox, Inc., San Francisco, CA (US)

(72) Inventors: James Cowling, San Francisco, CA (US); Kevin P. Modzelewski, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 232 days.

(21) Appl. No.: 14/091,119

(22) Filed: Nov. 26, 2013

(65) Prior Publication Data

US 2015/0149500 A1   May 28, 2015

(51) Int. Cl.
  *G06F 17/30* (2006.01)
  *G06F 11/20* (2006.01)

(52) U.S. Cl.
  CPC ........ *G06F 11/2094* (2013.01); *G06F 17/3033* (2013.01); *G06F 17/30212* (2013.01)

(58) Field of Classification Search
  USPC .................................................. 707/698, 769
  See application file for complete search history.

(56) References Cited

U.S. PATENT DOCUMENTS

| | | | |
|---|---|---|---|
| 6,374,262 B1 | 4/2002 | Kodama | |
| 7,443,321 B1 * | 10/2008 | Kaufman | .......... G06F 17/30312 341/106 |
| 7,788,224 B2 | 8/2010 | Fleck | |
| 8,392,482 B1 | 3/2013 | McAlister | |
| 8,959,067 B1 | 2/2015 | Patiejunas | |
| 2003/0115433 A1 | 6/2003 | Kodama | |
| 2004/0062106 A1 * | 4/2004 | Ramesh | .............. G06F 17/3048 365/202 |
| 2005/0125625 A1 | 6/2005 | Kilian | |
| 2005/0125627 A1 | 6/2005 | Kilian | |
| 2005/0144172 A1 | 6/2005 | Kilian | |
| 2006/0095458 A1 * | 5/2006 | Siu | ........................ G06F 21/10 |
| 2006/0116989 A1 * | 6/2006 | Bellamkonda | .... G06F 17/30489 |
| 2008/0059749 A1 | 3/2008 | Kathuria | |
| 2013/0110845 A1 * | 5/2013 | Dua | ................. G06F 17/30424 707/741 |
| 2013/0254240 A1 | 9/2013 | Kurita | |
| 2014/0095458 A1 * | 4/2014 | Kim | .................... G06F 17/3033 707/698 |
| 2014/0195745 A1 | 7/2014 | Shiratori | |
| 2015/0213016 A1 * | 7/2015 | Kim | .................... G06F 17/3033 707/747 |

OTHER PUBLICATIONS

U.S. Appl. No. 14/224,786, filed Mar. 25, 2014, Office Action, Mailing Date Apr. 6, 2016.

* cited by examiner

*Primary Examiner* — Kim Nguyen
(74) *Attorney, Agent, or Firm* — Hickman Palermo Becker Bingham LLP (57) ABSTRACT

The disclosed embodiments relate to a data storage system that facilitates efficiently recovering from storage device failures. Upon receiving a request to retrieve a data block from the data storage system, the system uses a hash that identifies the data block to look up a bucket and an associated cell containing the data block. Note that the bucket aggregates a large number of data blocks and is located in the associated cell that comprises a set of object storage devices (OSDs). Within the cell, the system uses the bucket to look up an OSD that contains the bucket in a local bucket database (BDB) for the cell. Within the OSD, the system uses the bucket and the hash to look up an offset and a length for the data block in a write-ahead log that stores data blocks for the bucket. Finally, the system returns the data block from the determined offset.

21 Claims, 7 Drawing Sheets

MULTI-LEVEL LOOKUP ARCHITECTURE TO FACILITATE FAILURE RECOVERY

BACKGROUND

1. Field

The disclosed embodiments generally relate to data storage systems. More specifically, the disclosed embodiments relate to the design of a data storage system with a multi-level lookup that facilitates reducing the number of disk seeks involved in accessing data items and handling disk failures.

2. Related Art

Organizations are beginning to use cloud-based storage systems to store large volumes of data. These cloud-based storage systems are typically operated by hosting companies that maintain a sizable storage infrastructure, often comprising many thousands of servers that that are sited in geographically distributed data centers. Customers typically buy or lease storage capacity from these hosting companies. In turn, the hosting companies provision storage resources according to the customer's requirements and then enable the customers to access these storage resources.

In large storage infrastructures comprising thousands of active storage devices, individual storage devices, such as disk drives, routinely fail. Hence, it is important to be able to rapidly recover from such failures. While recovering from a storage device failure, a data storage system typically performs a number of operations, including allocating a new storage device to replace the failed storage device, and obtaining copies of the data items on the failed storage device from other locations in the storage infrastructure. (For fault tolerance reasons, data items are typically stored redundantly across multiple locations to enable copies of data items to be recovered after a storage device failure.) Finally, the data storage system migrates the obtained copies of the data items to the new storage device.

However, note that a failed storage device typically contains many thousands or even millions of data items, so this migration process can be very slow. Moreover, the process of updating the data-access structures that are used to locate the data items can also be very time-consuming. Because a large number of data items typically exists on a failed storage device, modifying the data-access structures for these data items to point to the new storage device can require a large number of updates. Moreover, performing these updates can potentially involve writing to a large number of storage devices containing location information for the data items.

Hence, what is needed is a system that facilitates recovering from storage device failures without having to migrate large numbers of individual data items, and without requiring time-consuming updates to associated data-access structures.

SUMMARY

The disclosed embodiments relate to a data storage system that facilitates efficiently recovering from storage device failures. Upon receiving a request to retrieve a data block from the data storage system, the system uses a hash that identifies the data block to look up a bucket and an associated cell containing the data block, wherein the lookup is performed in a hash database (HDB) for the data storage system. Note that the bucket aggregates a large number of data blocks and is located in the associated cell that comprises a set of object storage devices (OSDs). Next, within the cell, the system uses the bucket to look up an OSD that contains the bucket, wherein the lookup is performed in a local bucket database (BDB) for the cell. Then, within the OSD, the system uses the bucket and the hash to look up an offset and a length for the data block in a write-ahead log that stores data blocks for the bucket. Finally, the system returns the data block from the determined offset in the write-ahead log.

In some embodiments, upon receiving a request to write a data block to the data storage system, the system uses the data block to compute a hash that functions as a global identifier for the data block. The system then selects a writeable bucket and an associated cell for the data block. Next, within the associated cell, the system uses the selected bucket to look up an OSD for the data block, wherein the lookup is performed in a local BDB for the selected cell. Within the OSD, the system appends the data block to a write-ahead log that stores data blocks for the bucket. Finally, the system updates the HDB to include an entry that maps the hash to the selected bucket and associated cell.

In some embodiments, upon detecting a failure of an OSD that is associated with a bucket, the system marks the bucket as non-writable, and then performs a fast block-copy of the bucket to a new OSD in the same cell. Next, the system updates the BDB for the cell to indicate that the bucket is associated with the new OSD.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Before describing the details of the data storage system, we first describe the structure of an exemplary online content-management system 120, that includes such a data storage system and that operates within a content-management environment 105.

Content-Management Environment

Figure 1:
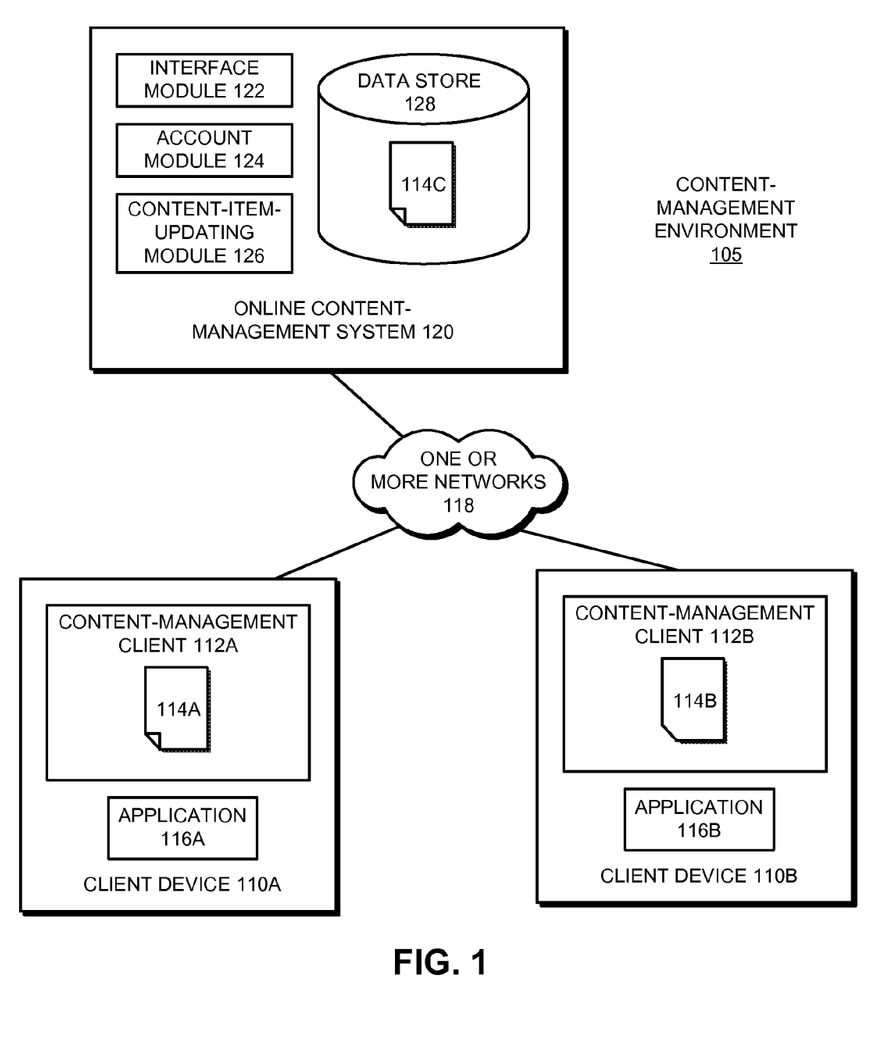
FIG. 1 illustrates a content-management environment in accordance with the disclosed embodiments.

FIG. 1 illustrates content-management environment 105 according to various embodiments. As may be understood from this figure, content-management environment 105 includes a plurality of client devices 110A and 110B (collectively 110) and an online content-management system 120 that are interconnected by one or more networks 118. Various aspects of the client devices 110 and online content-management system 120 are discussed below.

Client Devices

In various embodiments, each client device 110 may selectively execute a content-management client application 112A and 112B (collectively 112) (also referred to as a "content-management client") that may be used to access content items stored within online content-management system 120. In some embodiments, synchronized copies of a content item 114A, 114B and 114C are maintained on client devices 110A and 110B and within online content-management system 120, respectively. (Note that a "content item" can include a file, a folder, a set of folders, or any other type of data object.) In some embodiments, client devices 110 may provide a file-browser type interface (not shown) for directly manipulating the content items stored on online content-management system 120 without maintaining a local copy. Client devices 110 may also include applications 116A and 116B (collectively 116) that manipulate copies of content items 114A and 114B.

While only two client devices 110A and 110B are shown in FIG. 1 for purposes of clarity, it should be understood by those skilled in the art that many client devices 110 may simultaneously connect through network(s) 118 to online content-management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synced copy of one or more content items from within online content-management system 120, and the content items may be stored in any suitable format. When content-management client 112 presents content items that are stored within the online content-management system 120 to a user, the content items may be arranged in folders and the folders themselves may be arranged in other folders, or in any other arbitrary arrangement supported by online content-management system 120, as determined by the user. However, one of skill in the art should understand in light of this disclosure that each user's content item storage architecture may be considerably different from the next, and in some instances, the content item storage architecture may be implemented to maximize storage and content item retrieval efficiency.

Content-Management System

Online content-management system 120 stores content items and manages access to those content items via client devices 110. Online content-management system 120 and its components may be implemented using any appropriate hardware and software that supports file serving, storage, and retrieval functions. For example, online content-management system 120 may be implemented in a single server or multiple servers.

In various embodiments, online content-management system 120 includes interface module 122, account module 124, content-item-updating module 126, and data store 128. Some of the elements of online content-management system 120 are discussed below.

Content-Management System—Interface Module

In particular embodiments, interface module 122 may facilitate content item access and content item storage operations among online content-management system 120 and client devices 110. Interface module 122 may receive content items from and send content items to client devices 110 consistent with the user's preferences for sharing content items. Interface module 122 may also act as the counterpart to a client-side file-explorer style user interface that allows a user to manipulate content items directly stored on online content-management system 120. In some embodiments, software on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via an application 116) and allow a user to manipulate content items stored within online content-management system 120. In this way, the user can directly manipulate content items stored within online content-management system 120.

Content-Management System—Data Store

In various embodiments, data store 128 may store content items such as those uploaded using client devices 110, or using any other suitable computing device. In the embodiment illustrated in FIG. 1, client device 110A, which is associated with a first user, is shown as locally storing at least one content item 114A, and client device 110B, which is associated with a second user, is shown as locally storing at least one content item 114B. As shown in FIG. 1, a copy of the locally stored content item 114C is maintained in data store 128 of online content-management system 120. In the embodiment illustrated in FIG. 1, content items 114A, 114B and 114C are local versions of the same shared document that reside on client devices 110A, 110B and online content-management system 120, respectively. Note that client devices 110A and 110B may also store other content items that are replicated on online content-management system 120, but are not shared with other client devices.

In various embodiments, data store 128 may maintain information identifying the user, information describing the user's file directory, and other information in a file journal that is maintained for each user. In some embodiments, the file journal may be maintained on online content-management system 120, and in other embodiments, a file journal (e.g., a "server-side file journal") may be maintained on both online content-management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within online content-management system 120 and the copy of the content item 114B on client device 110B. Similarly, any changes that are made to content item 114C on online content-management system 120 may also be automatically reflected in the copy of content item 114A stored on client device 110A, and the copy of content item 114B stored on client device 110B.

Also, content items 114A and 114B may be stored in local caches within content-management clients 112A and 112B, respectively. Alternatively, content items 114A and 114B may be stored in local file systems within content-management clients 112A and 112B. In some situations, content items 114A and 114B are stored in file system space that is reserved for content-management clients 112A and 112B. In other situations, content items 114A and 114B are stored in normal file system space that is not reserved for content-management clients 112A and 112B.

Content-Management System—Account Module

In particular embodiments, account module 124 may track content items stored in data store 128 and entries in the server-side file journal for each content item. As users grant content-item-access permissions to other users, account module 124 may update the server-side file journal associated with each relevant user in data store 128. Account module 124 may also track client devices 110 that are associated with each user's account. For example, a user may want to share all their content items among their desktop computer, tablet computer, and mobile device. To make such a sharing arrangement seamless to the user, the user's single account on online content-management system 120 may be associated with each of the user's respective client devices. In some embodiments, an application running on each respective client device 110 may help to coordinate synchronization of content items on the client device with corresponding versions of the content items within the user's account in online content-management system 120, and also with corresponding versions of the content items stored on the user's various other client devices.

Content-Management System—Content-Item-Updating Module

In particular embodiments, content-item-updating module 126 is configured to maintain consistency among different copies (versions) of a content item 114A, 114B and 114C that are located in client device 110A, client device 110B and online content-management system 120, respectively. This can be complicated, because the different versions 114A, 114B and 114C of the same shared content items may be simultaneously changed at client devices 110A-B and online content-management system 120. Hence, online content-management system 120 needs to enforce an updating policy to resolve conflicting updates to different versions of the same content item. For example, the copy of the content item 114C on online content-management system 120 can be the master copy of the content item, and updates to the various copies 114A and 114B of the content item can be serialized and applied one-at-a-time to the master copy 114C before being propagated back to the copies 114A and 114B located on client devices 110A and 110B.

Data Centers

Figure 2:
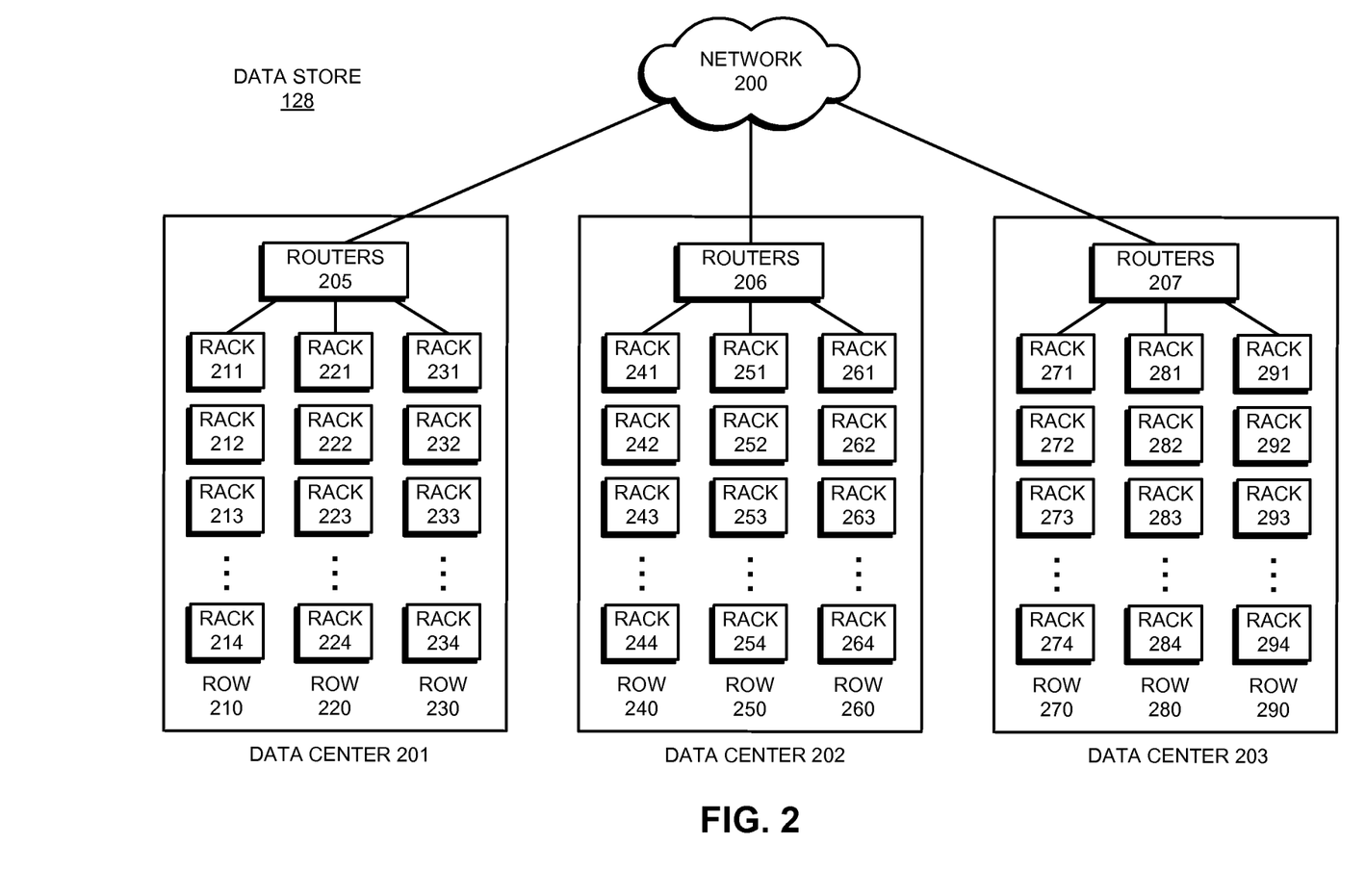
FIG. 2 illustrates a set of data centers in accordance with the disclosed embodiments.

We next describe the data centers that provide the infrastructure for the data storage system. FIG. 2 illustrates an exemplary data store 128 (from FIG. 1) that comprises a set of data centers 201-203 in accordance with the disclosed embodiments. Note that data store 128 can be smaller than the system illustrated in FIG. 2. (For example, data store 128 can comprise a single server that is connected to a number of disk drives, a single rack that houses a number of servers, a row of racks, or a single data center with multiple rows of racks.) As illustrated in FIG. 2, data store 128 can include a set of geographically distributed data centers 201-203 that may be located in different states, different countries or even on different continents.

Data centers 201-203 are coupled together through a network 200, wherein network 200 can be a private network with dedicated communication links, or a public network, such as the Internet, or a virtual-private network (VPN) that operates over a public network.

Communications to each data center pass through a set of routers that route the communications to specific storage nodes within each data center. More specifically, communications with data center 201 pass through routers 205, communications with data center 202 pass through routers 206, and communications with data center 203 pass through routers 207.

As illustrated in FIG. 2, routers 205-207 channel communications to storage devices within the data centers, wherein the storage devices are incorporated into servers that are housed in racks, wherein the racks are organized into rows within each data center. For example, the racks within data center 201 are organized into rows 210, 220 and 230, wherein row 210 includes racks 211-214, row 220 includes racks 221-224 and row 230 includes racks 231-234. The racks within data center 202 are organized into rows 240, 250 and 260, wherein row 240 includes racks 241-244, row 250 includes racks 251-254 and row 260 includes racks 261-264. Finally, the racks within data center 203 are organized into rows 270, 280 and 290, wherein row 270 includes racks 271-274, row 280 includes racks 281-284 and row 290 includes racks 291-294.

As illustrated in FIG. 2, data store 128 is organized hierarchically, comprising multiple data centers, wherein machines within each data center are organized into rows, wherein each row includes one or more racks, wherein each rack includes one or more servers, and wherein each server (also referred to as an "object storage device" (OSD)) includes one or more storage devices (e.g., disk drives).

Data Storage System

Figure 3:
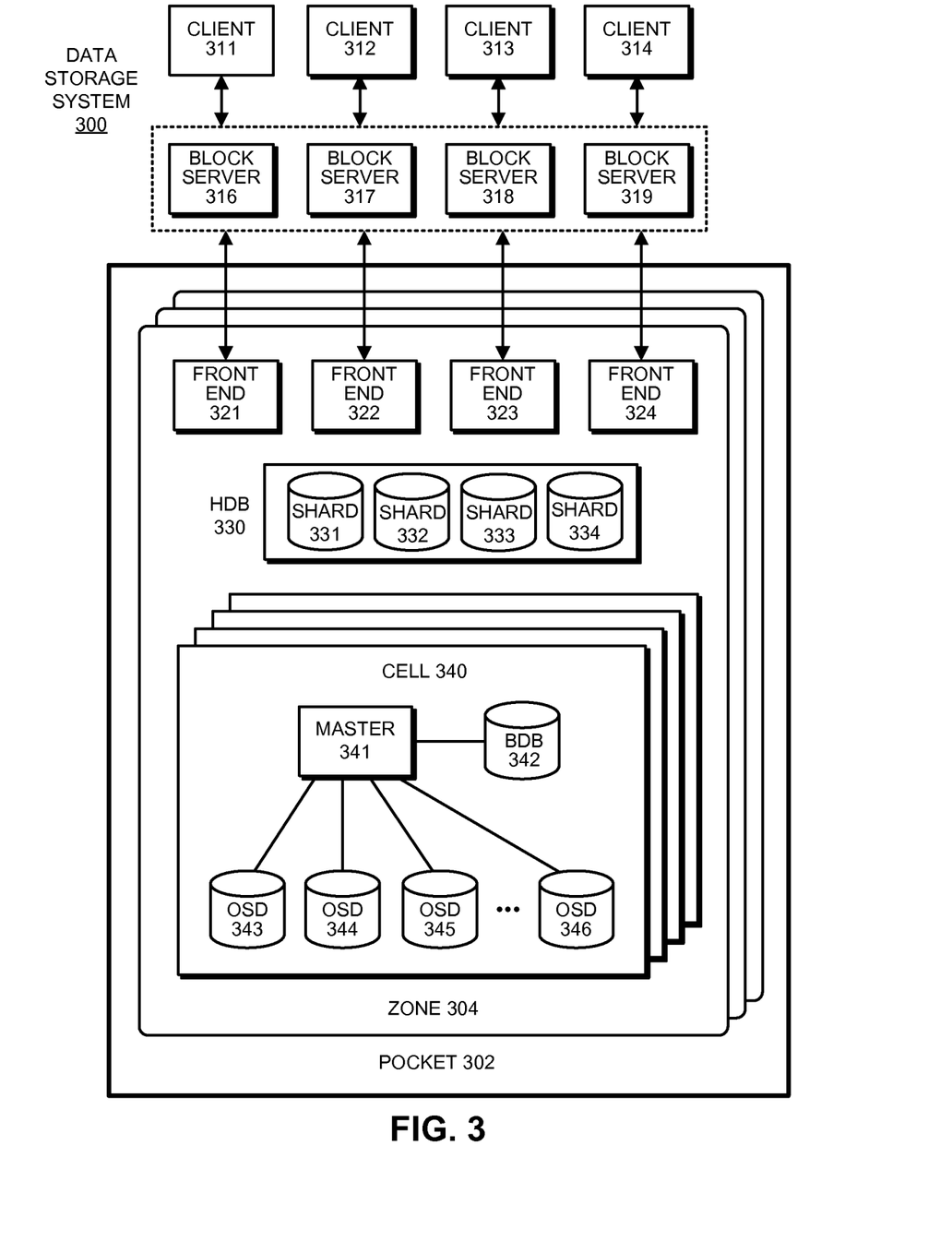
FIG. 3 illustrates the logical structure of the data storage system in accordance with the disclosed embodiments.

FIG. 3 illustrates the logical structure of the data storage system 300 in accordance with the disclosed embodiments. As illustrated in FIG. 3, data storage system 300 includes a logical entity called a "pocket" 302 that in some embodiments is equivalent to an Amazon S3™ bucket. Each pocket is completely distinct; nothing is shared between pockets. For example, in an exemplary implementation, the system provides a "block storage pocket" to store data files, and a "thumbnail pocket" to store thumbnail images for data objects. Note that the applications specify which pockets are to be accessed.

Within a pocket one or more "zones" exist that are associated with physical data centers, and these physical data centers can reside at different geographic locations. For example, one data center might be located in California, another data center might be located in Virginia, and another data center might be located in Europe. For fault-tolerance purposes, data can be stored redundantly by maintaining multiple copies of the data on different servers within a single data center and also across multiple data centers.

For example, when a data item first enters a data center, it can be initially replicated to improve availability and provide fault tolerance. It can then be asynchronously propagated to other data centers.

Note that storing the data redundantly can simply involve making copies of data items, or alternatively using a more space-efficient encoding scheme, such as erasure codes (e.g., Reed-Solomon codes) or Hamming codes to provide fault tolerance.

Within each zone (such as zone 304 in FIG. 3), there exist a set of front ends 321-324, a hash database (HDB) 330 and a set of "cells," such as cell 340 illustrated in FIG. 3. A typical cell 340 includes a number of object storage devices (OSDs) 343-346, wherein the individual OSDs 343-346 include storage devices that actually store data blocks. Cell 340 also includes a "master" 341, which is in charge of managing OSDs 343-346 and a bucket database (BDB) 342 described in more detail below. (Note that HDB 330 and BDB 342 are logical databases which can be stored redundantly in multiple physical databases to provide fault tolerance.)

Master 341 performs a number of actions. For example, master 341 can determine how many writeable buckets the system has at any point in time. If the system runs out of buckets, master 341 can create new buckets and allocate them to the storage devices. Master 341 can also monitor OSDs and associated storage devices, and if any OSD or storage device fails, master 341 can migrate the associated buckets to other OSDs.

As illustrated in FIG. 3, a number of block servers 316-319, which are typically located in a data center associated with a zone, can service requests from a number of clients 311-314. For example, clients 311-314 can comprise applications running on client machines and/or devices that access data items in data storage system 300. Block servers 316-319 in turn forward the requests to front ends 321-324 that are located within specific zones, such as zone 304 illustrated in FIG. 3. Note that clients 311-314 communicate with front ends 321-324 through block servers 316-319, and the front ends 321-324 are the only machines within the zones that have public IP addresses.

Files to be stored in data storage system 300 comprise one or more data blocks that are individually stored in data storage system 300. For example, a large file can be associated with multiple data blocks, wherein each data block is 1 MB to 4 MBs in size.

Moreover, each data block is associated with a "hash" that serves as a global identifier for the data block. The hash can be computed from the data block by running the data block through a hash function, such as a SHA-256 hash function. (The SHA-256 hash function is defined as a Federal Information Processing Standard (FIPS) by the U.S. National Institute of Standards and Technology (NIST).) The hash is used by data storage system 300 to determine where the associated data block is stored.

Get( ) Operation

The system performs a number of operations while processing data accesses on behalf of clients 311-314. For example, when a get( ) operation is received along with an associated hash, the hash is used to perform a lookup in HDB 330. This lookup returns an identifier for a "bucket" and associated cell where the data block is stored.

To streamline failure-recovery operations, a large number of data blocks can be aggregated into larger buckets. For example, a number of 1-4 MB data blocks can be aggregated into a single 1 GB bucket, wherein each bucket is stored in a specific cell. This enables the system to manipulate a small number of buckets during a failure-recovery operation instead of manipulating a large number of individual data blocks. Aggregating data blocks into buckets also greatly decreases the amount of metadata the system has to maintain and manipulate; this is advantageous because metadata is computationally expensive to maintain and manipulate.

Because a large number of data blocks can exist in data storage system 300, HDB 330 can potentially be very large. If HDB 330 is very large, it is advantageous to structure HDB 330 as a "sharded" database. For example, when performing a lookup based on a hash in HDB 330, the first 8 bits of the hash can be used to associate the hash with one of 256 possible shards, and this shard can be used to direct the lookup to an associated instance of HDB 330. For example, as illustrated in FIG. 3, HDB 330 can comprise 4 instances 331-334, wherein instance 331 is associated with shards 1-64, instance 332 is associated with shards 65-128, instance 333 is associated with shards 129-192 and instance 334 is associated with shards 193-256. In other embodiments, HDB 330 can be divided into more or fewer instances. (Note that a zone can include a "ZooKeeper™ cluster" that is responsible for mapping shards to specific target cells and also mapping shards to physical HDB machines.)

HDB instances 331-334 are logical databases that are mapped to physical databases, and to provide fault tolerance, each logical database can be redundantly stored in multiple physical databases. For example, in one embodiment, each HDB instance maps to three physical databases. If data storage system 300 is very large (for example containing trillions of data blocks), HDB 330 will be too large to fit in random-access memory. In this case HDB 330 will mainly be stored in non-volatile storage, which for example, can comprise flash drives or disk drives.

After the bucket and associated cell are identified for the get( ) operation, the system performs a lookup in a bucket database (BDB) 342 in the associated cell 340. This lookup returns an identifier for an object storage device (OSD) 343 where the bucket is located. Note that because each bucket is fairly large (e.g., 1 GB) and contains a large number of data blocks, BDB 342 is relatively small and can typically be stored in random-access memory, which greatly speeds up the lookup process.

Finally, within the OSD, the system performs a lookup based on the bucket and the hash to determine an offset and a length for the data block in a write-ahead log that stores data blocks for the bucket. The system then returns the data block from the determined offset in the write-ahead log. Note that because data storage system 300 is designed to store "immutable data" that does not change after it is written, it is efficient to store the immutable data in a write-ahead log, as opposed to a random-access structure. Because the data is never overwritten, writes do not require more-complex and time-consuming random-access lookup mechanisms.

Put( ) Operation

During a put( ) operation, the system receives a data block to be written from a client. To process the put( ) operation, the system first computes a hash from the data block, for example using the SHA-256 technique described above. Next, the system selects a writeable bucket and an associated cell for the data block. Note that front ends 321-324 periodically poll all the BDBs to identify and then cache writeable buckets. This enables front ends 321-324 to keep track of a number of buckets (e.g., 10 to 100 buckets) that they know are writeable at any given time. Then, when a put( ) operation is subsequently received, a front end simply selects a cached bucket that it knows is writable.

Within the associated cell, the system uses an identifier for the selected bucket to perform a lookup in the BDB. This lookup returns one or more OSDs for the bucket. (Note that the bucket may be replicated across multiple OSDs to provide fault tolerance.) Within the OSDs, the system appends the data block to a write-ahead log that stores data blocks for the bucket. After the data is stably written to the OSDs, the system writes the hash-to-bucket mapping to the HDB 330.

Note that the master 341 modifies the BDB 342 and the front end 321 modifies the HDB 330. In general, master 341 is concerned with reliability of storage, and hence performs operations to facilitate redundancy and rebalancing, while the front end 321 is generally concerned with finding information and simply maps hashes to logical constructs, such as buckets.

Master 341 performs various operations to detect and handle failures. More specifically, master 341 periodically performs health checks on OSDs. If master 341 detects a failure in an OSD, the associated buckets are degraded and the master sets the buckets to be non-writable. Note that get( ) operations have to access the buckets where the blocks are stored, but put( ) operations can be directed to any bucket that is currently writeable, so when a problem happens with a bucket, the system simply marks the bucket as non-writeable. The system can continue performing get( ) operations on the degraded bucket, because there exist multiple copies of the degraded bucket.

To handle a failure associated with a bucket, master 341 tells the associated OSDs to freeze the bucket. Master 341 then tells the OSDs to replicate the bucket to a new OSD. The system then adds the new OSD to the cluster, increments the generation number for the OSD, and marks the bucket as writeable. (Note that when a degraded OSD is restarted after a failure, it will not accept any reads because its generation number is old.) The system guarantees that every OSD in the current generation has valid data.

The system also includes mechanisms to perform compaction operations. Although the data stored in data storage system 300 is immutable, the system often needs to delete data items when users remove them from the system. In some embodiments, the system tracks deleted data items in a log, and when the usable storage in a given bucket falls below a threshold, the system compacts the bucket.

Object Storage Device

Figure 4A:
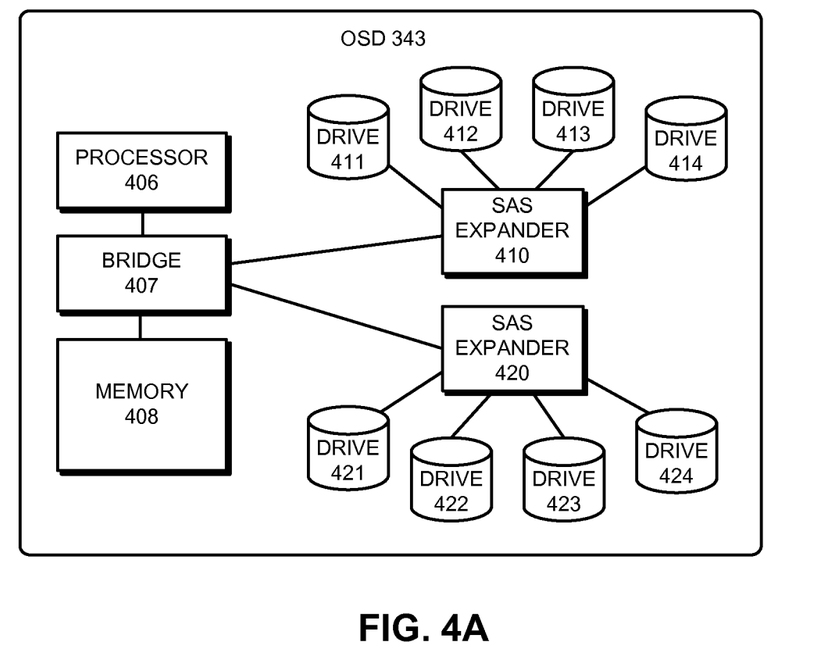
FIG. 4A illustrates the structure of an object storage device (OSD) in accordance with the disclosed embodiments.

FIG. 4A illustrates the structure of an exemplary object storage device (OSD) 343 in accordance with the disclosed embodiments. As illustrated in FIG. 4, OSD 343 includes a processor 406 that is connected to a memory 408 through a bridge 407. Processor 406 is also coupled to Serial Attached SCSI (SAS) expanders 410 and 420, where SAS expander 410 is coupled to disk drives 411-414 and SAS expander 420 is coupled to disk drives 421-424. (Note that SAS expanders 410 and 420 may be coupled to more or fewer disk drives.) Also, note that a failure in OSD 343 can involve a failure of a single one of the disk drives 411-414 or 421-424, or a failure that affects all or most of OSD 343, such as a failure in processor 406, bridge 407, memory 408, SAS expanders 410 and 420 or one of the associated data paths.

Write-Ahead Log

Figure 4B:
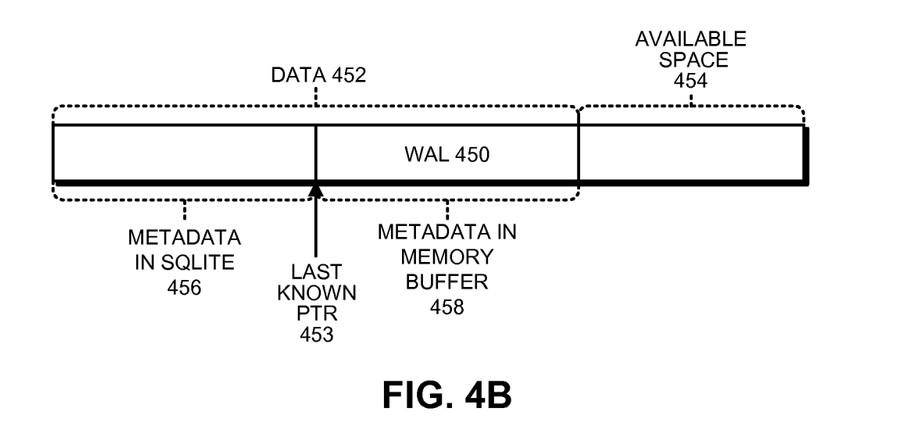
FIG. 4B illustrates the structure of a write-ahead log (WAL) in accordance with the disclosed embodiments.

FIG. 4B illustrates the structure of a write-ahead log (WAL) 450 which is maintained within an OSD (such as OSD 343) in accordance with the disclosed embodiments. WAL 450 provides a log-structured data store which is advantageous for storing immutable data. WAL 450 comprises one or more 1 GB extents which can be associated with the logical buckets described above. As illustrated in FIG. 4B, an extent can include a "data portion" 452 that has already been written to, and an unwritten portion that contains available space 454. The data blocks that are stored within data portion 452 are associated with metadata that, for example, contains hashes and the offsets for the data blocks. The majority of this metadata 456 is stored in non-volatile storage which, for example, can comprise a SQLite™ database. Metadata associated with recently written data blocks 458 can be stored in a memory buffer.

When the system recovers from a failure, all of the metadata can be reconstructed by scanning through WAL 450. The reason for storing metadata in SQLite is so that when the system restarts after a failure, the system does not have to read the entire log again. The system can simply scan the log starting from a last known pointer 453 which is associated with the last metadata that is stored in the SQLite database. To improve performance, some of the metadata that is stored into SQLite database can also be stored in the memory buffer, if such space is available.

During a put( ) operation, the system synchronously appends the data block and an associated header to the WAL 450, wherein the header includes a number of data items associated with the block, including the hash and the length of the block. At the same time, the system synchronously adds metadata to the memory buffer, and then asynchronously commits the metadata to the SQLite database. When a bucket becomes full, the system seals the bucket, and the bucket never gets modified again.

During a get( ) operation, the system checks the memory buffer to find the offset and length for the data block. (Note that for some older data blocks, the system may have to access the SQLite metadata to obtain the offset and length.) The system then uses the offset and length to read the data block from WAL 450.

Get( ) Operation

Figure 5:
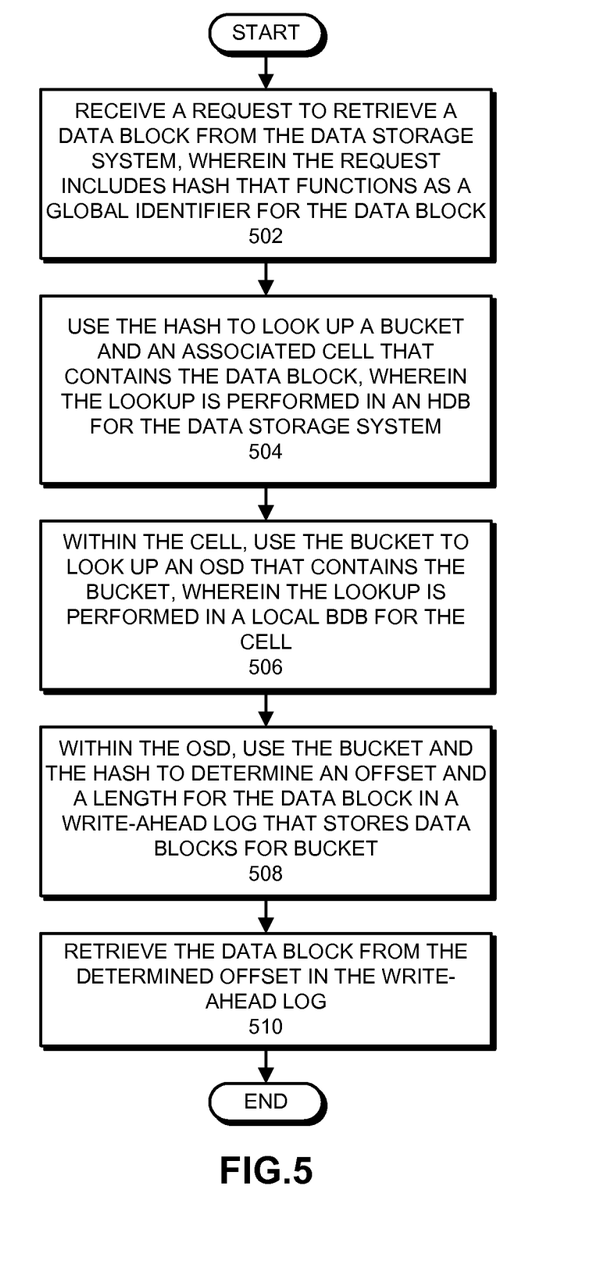
FIG. 5 presents a flow chart illustrating how a get( ) operation is processed in accordance with the disclosed embodiments.

FIG. 5 presents a flow chart illustrating how a "get( )" operation is processed in accordance with the disclosed embodiments. At the start of this process, the system receives a request to retrieve a data block from the data storage system, wherein the request was generated by a client performing a get( ) operation. This request includes a hash parameter that functions as a global identifier for the data block (step 502). Next, the system uses the hash to look up a bucket and an associated cell that contains the data block, wherein the lookup is performed in an HDB for the data storage system (step 504). Recall that the HDB can be a sharded database, and this lookup can involve examining the first byte of the hash to identify a corresponding shard, and then performing the lookup in a specific HDB instance associated with the shard. Also, recall that this lookup is likely to involve a random disk seek.

Within the cell, the system uses the bucket to look up an OSD that contains the bucket, wherein the lookup is performed in a local BDB for the cell (step 506). Recall that because the local BDB can be stored in memory, this lookup can be fast. Then, within the OSD, the system uses the bucket and the hash to determine an offset and a length for the data block in a write-ahead log that stores data blocks for the bucket (step 508). Finally, the system returns the data block from the determined offset in the write-ahead log (step 510).

Put( ) Operation

Figure 6:
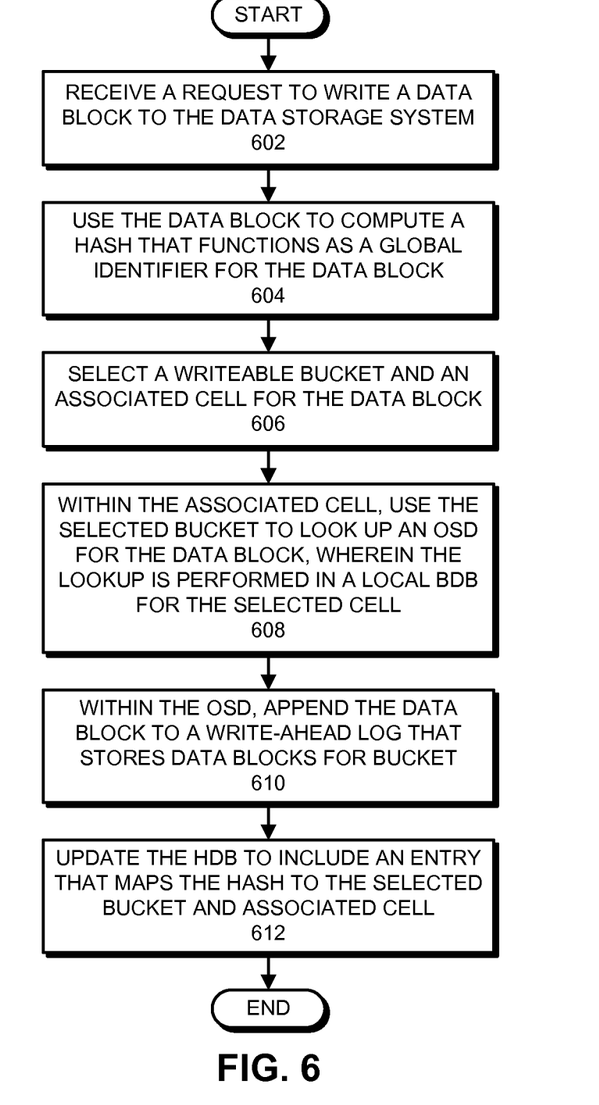
FIG. 6 presents a flow chart illustrating how a put( ) operation is processed in accordance with the disclosed embodiments.

FIG. 6 presents a flow chart illustrating how a "put( )" operation is processed in accordance with the disclosed embodiments. At the start of this process, the system receives a request to write a data block to the data storage system, wherein the request was generated by a client performing a put( ) operation (step 602). Next, the system uses the data block to compute a hash that functions as a global identifier for the data block (step 604). As mentioned above, computing this hash can involve feeding the data block through a SHA-256 hash module. Then, the system selects a writeable bucket and an associated cell for the data block (step 606). Recall that the system maintains a pool of available buckets. Within the associated cell, the system uses the selected bucket to look up an OSD for the data block, wherein the lookup is performed in a local BDB for the selected cell (step 608). Because the BDB is typically located in memory, this lookup can be fast. (Also, note that the bucket can be replicated across a number of cells, in which case the lookup returns multiple OSDs containing copies of the bucket, and the data block is written to each of the multiple OSDs.)

Next, within the OSD, the system appends the data block to a write-ahead log that stores data blocks for the bucket (step 610). Note that committing the write-ahead log to disk typically involves a sequential disk seek. Finally, the system updates the HDB to include an entry that maps the hash to the selected bucket and associated cell (step 612).

Recovering From a Storage Device Failure

Figure 7:
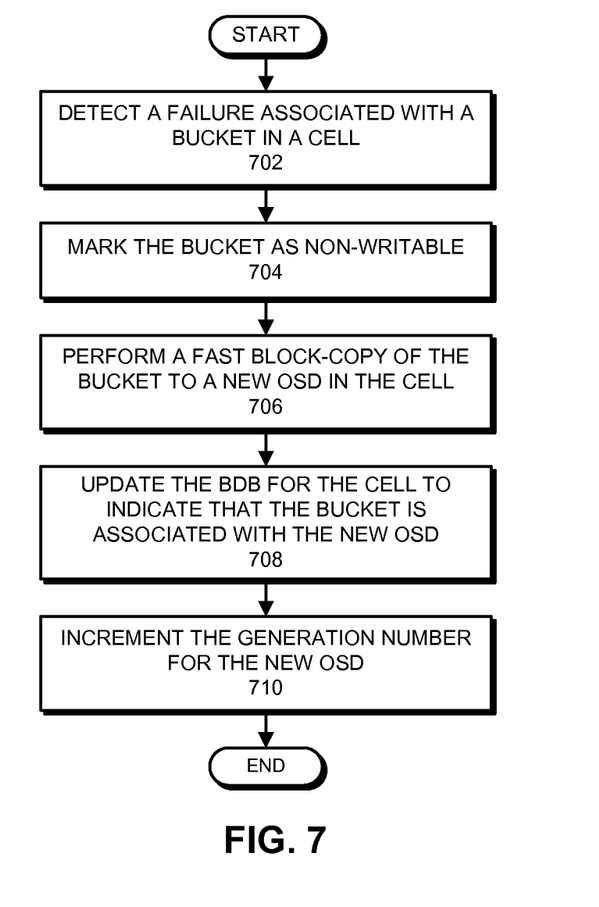
FIG. 7 presents a flow chart illustrating how a failure of a storage device is handled in accordance with the disclosed embodiments.

FIG. 7 presents a flow chart illustrating how a failure of a storage device is handled in accordance with the disclosed embodiments. At the start of this process, the system detects a failure associated with a bucket in a cell (step 702). (For example, the system can detect a failure in an OSD that stores a copy of the bucket.) Next, the system marks the bucket as non-writable (step 704). The system then performs a fast block-copy of the bucket to a new OSD in the cell (step 706). The systems also updates the BDB for the cell to indicate that the bucket is associated with the new OSD (step 708). Finally, the system increments the new generation number for the OSD (step 710). Recall that when a degraded OSD is restarted after a failure, it will not accept any reads because its generation number is old.

CONCLUSION

The described embodiments relate to a data storage system for immutable data that improves performance by minimizing the number of disk seeks required to perform put( ) and get( ) operations. It also minimizes the number of individual data items that have to be modified when recovering from a disk failure. This is accomplished by aggregating thousands of data blocks into each bucket, and then using an access architecture that maps these larger buckets to specific storage locations, instead of mapping individual data blocks to specific storage locations. Because this multi-level lookup architecture first maps hashes to buckets using HDB 330, and then maps buckets to OSDs using BDB 342, when the system moves a copy of a bucket (for example, during a failure-recovery operation), the associated entry in HDB 330 for the bucket does not change. Only the entry in BDB 342 changes and this change is very fast because BDB 342 is relatively small and can fit in memory.

Note that if the system had naively mapped hashes directly to OSDs, when an OSD fails, the system would need to perform 100,000+ separate updates because an OSD holds 100,000+ separate data blocks. In contrast, because the system maps hashes to large buckets and then maps the larger buckets to OSDs, when an OSD fails, the system simply changes the location of the bucket, and does not have to individually change the locations of each of the individual data blocks. Also note that while recovering from a failure, the system can perform a fast block transfer of a bucket from an OSD that contains a copy of the bucket to a new OSD, and this type of block transfer is very fast.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A computer-implemented method for operating a data storage system, comprising:
   receiving a request to retrieve a data block from the data storage system, wherein the request includes a hash that functions as a global identifier for the data block;
   using the hash to look up a bucket and an associated cell that contains the data block, wherein the bucket aggregates a large number of data blocks, wherein the bucket is located in the associated cell that comprises a set of object storage devices (OSDs), and wherein the lookup is performed in a hash database (HDB) for the data storage system;
   within the cell, using the bucket to look up an OSD that contains the bucket, wherein the lookup is performed in a local bucket database (BDB) for the cell;
   within the OSD, using the bucket and the hash to determine an offset and a length for the data block in a write-ahead log that stores data blocks for the bucket; and
   returning the data block from the determined offset in the write-ahead log;
   wherein an OSD comprises a server that comprises one or more storage devices.

2. The computer-implemented method of claim 1, further comprising:
   receiving a request to write a data block to the data storage system;
   using the data block to compute a hash that functions as a global identifier for the data block;
   selecting a writeable bucket and an associated cell for the data block;
   within the associated cell, using the selected bucket to look up an OSD for the data block, wherein the lookup is performed in a local BDB for the selected cell;
   within the OSD, appending the data block to a write-ahead log that stores data blocks for the bucket; and
   updating the HDB to include an entry that maps the hash to the selected bucket and associated cell.

3. The computer-implemented method of claim 1, wherein upon detecting a failure associated with a bucket in a cell, the method further comprises:
   marking the bucket as non-writable;
   performing a fast block-copy of the bucket to a new OSD in the cell; and
   updating the BDB for the cell to indicate that the bucket is associated with the new OSD.

4. The computer-implemented method of claim 1, wherein the HDB comprises a sharded database that stores hash-to-bucket mappings for multiple cells.

5. The computer-implemented method of claim 1, wherein the BDB is stored in random access memory to facilitate performing bucket-to-OSD lookups without having to access a storage device.

6. The computer-implemented method of claim 1, wherein determining the offset for the data block in a write-ahead log comprises performing an in-memory lookup in the OSD without accessing a storage device.

7. The computer-implemented method of claim 1,
wherein each OSD is associated with a generation number that is incremented after a failure-recovery operation completes; and
wherein the generation number is used to prevent an OSD associated with an old generation number, and therefore possibly containing invalid data, from servicing read operations.

8. The computer-implemented method of claim 1, wherein a storage device corresponds to a disk drive.

9. A non-transitory computer-readable storage medium storing instructions that when executed by a computer cause the computer to perform a method for operating a data storage system, the method comprising:
receiving a request to retrieve a data block from the data storage system, wherein the request includes a hash that functions as a global identifier for the data block;
using the hash to look up a bucket and an associated cell that contains the data block, wherein the bucket aggregates a large number of data blocks, wherein the bucket is located in the associated cell that comprises a set of object storage devices (OSDs), and wherein the lookup is performed in a hash database (HDB) for the data storage system;
within the cell, using the bucket to look up an OSD that contains the bucket, wherein the lookup is performed in a local bucket database (BDB) for the cell;
within the OSD, using the bucket and the hash to determine an offset and a length for the data block in a write-ahead log that stores data blocks for the bucket; and
returning the data block from the determined offset in the write-ahead log;
wherein an OSD comprises a server that comprises one or more storage devices.

10. The non-transitory computer-readable storage medium of claim 9, wherein the method further comprises:
receiving a request to write a data block to the data storage system;
using the data block to compute a hash that functions as a global identifier for the data block;
selecting a writeable bucket and an associated cell for the data block;
within the associated cell, using the selected bucket to look up an OSD for the data block, wherein the lookup is performed in a local BDB for the selected cell;
within the OSD, appending the data block to a write-ahead log that stores data blocks for the bucket; and
updating the HDB to include an entry that maps the hash to the selected bucket and associated cell.

11. The non-transitory computer-readable storage medium of claim 9, wherein upon detecting a failure associated with a bucket in a cell, the method further comprises:
marking the bucket as non-writable;
performing a fast block-copy of the bucket to a new OSD in the cell; and
updating the BDB for the cell to indicate that the bucket is associated with the new OSD.

12. The non-transitory computer-readable storage medium of claim 9, wherein the HDB comprises a sharded database that stores hash-to-bucket mappings for multiple cells.

13. The non-transitory computer-readable storage medium of claim 9, wherein the BDB is stored in random access memory to facilitate performing bucket-to-OSD lookups without having to access a storage device.

14. The non-transitory computer-readable storage medium of claim 9, wherein determining the offset for the data block in a write-ahead log comprises performing an in-memory lookup in the OSD without accessing a storage device.

15. The non-transitory computer-readable storage medium of claim 9,
wherein each OSD is associated with a generation number that is incremented after a failure-recovery operation completes; and
wherein the generation number is used to prevent an OSD associated with an old generation number, and therefore possibly containing invalid data, from servicing read operations.

16. A data storage system, comprising:
one or more zones, wherein each zone is associated with a data center;
wherein each zone is divided into a plurality of cells;
wherein each cell comprises a plurality of object storage devices (OSDs) for storing blocks of data, and a master for managing the OSDs and wherein the master comprises one or more processors and memory; and
wherein during operation, the data storage system is configured to,
receive a request to retrieve a data block from the data storage system, wherein the request includes a hash that functions as a global identifier for the data block,
use the hash to look up a bucket and an associated cell that contains the data block, wherein the bucket aggregates a large number of data blocks and is located in the associated cell, and wherein the lookup is performed in a hash database (HDB) for the data storage system;
within the cell, use the bucket to look up an OSD that contains the bucket, wherein the lookup is performed in a local bucket database (BDB) for the cell;
within the OSD, use the bucket and the hash to determine an offset and a length for the data block in a write-ahead log that stores data blocks for the bucket; and
return the data block from the determined offset in the write-ahead log;
wherein an OSD comprises a server that comprises one or more storage devices.

17. The data storage system of claim 16, wherein during operation, the data storage system is additionally configured to:
receive a request to write a data block to the data storage system;
use the data block to compute a hash that functions as a global identifier for the data block;
select a writeable bucket and an associated cell for the data block;
within the associated cell, use the selected bucket to look up an OSD for the data block, wherein the lookup is performed in a local BDB for the selected cell;
within the OSD, append the data block to a write-ahead log that stores data blocks for the bucket; and
update the HDB to include an entry that maps the hash to the selected bucket and associated cell.

18. The data storage system of claim 16, wherein upon detecting a failure associated with a bucket in a cell, the data storage system is configured to:
mark the bucket as non-writable;
perform a fast block-copy of the bucket to a new OSD in the cell; and
update the BDB for the cell to indicate that the bucket is associated with the new OSD.

19. The data storage system of claim 16, wherein the HDB comprises a sharded database that stores hash-to-bucket mappings for multiple cells.

20. The data storage system of claim 16, wherein the BDB is stored in random access memory to facilitate performing bucket-to-OSD lookups without having to access a storage device.

21. The data storage system of claim 16, wherein while determining the offset for the data block in a write-ahead log, the OSD is configured to perform an in-memory lookup without accessing a storage device.

\* \* \* \* \*